United States Patent
Bolduan

(10) Patent No.: US 8,203,441 B2
(45) Date of Patent: Jun. 19, 2012

(54) DISPLAY SYSTEM

(75) Inventor: Dirk Bolduan, Erzhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 571 days.

(21) Appl. No.: 12/397,050

(22) Filed: Mar. 3, 2009

(65) Prior Publication Data

US 2009/0273457 A1 Nov. 5, 2009

(30) Foreign Application Priority Data

Mar. 3, 2008 (DE) .......................... 10 2008 012 240

(51) Int. Cl.
*B60Q 1/00* (2006.01)

(52) U.S. Cl. .................. 340/438; 340/426.28; 340/468; 340/471

(58) Field of Classification Search .................. 340/438, 340/426.28, 468, 471; 701/22, 29, 49, 112, 701/113

See application file for complete search history.

(56) References Cited

U.S. PATENT DOCUMENTS

| | | | | |
|---|---|---|---|---|
| 5,684,470 A * | 11/1997 | DeLand et al. | | 340/12.5 |
| 5,713,621 A | 2/1998 | Krenkel et al. | | |
| 6,133,827 A * | 10/2000 | Alvey et al. | | 340/438 |
| 6,137,419 A | 10/2000 | Lennox et al. | | |
| 6,179,453 B1 * | 1/2001 | McMahon | | 362/490 |
| 7,068,160 B2 * | 6/2006 | Tourneur et al. | | 340/471 |
| 7,649,444 B1 * | 1/2010 | Fear et al. | | 340/438 |
| 7,755,472 B2 * | 7/2010 | Grossman | | 340/426.1 |
| 2003/0216817 A1 * | 11/2003 | Pudney | | 700/17 |
| 2007/0241585 A1 * | 10/2007 | Shimizu | | 296/146.6 |
| 2009/0072583 A1 * | 3/2009 | Elliott et al. | | 296/155 |

FOREIGN PATENT DOCUMENTS

| | | |
|---|---|---|
| DE | 10306135 A1 | 8/2004 |
| GB | 1266157 A | 3/1972 |
| GB | 1535767 A | 12/1978 |

* cited by examiner

*Primary Examiner* — Hung T. Nguyen

(74) *Attorney, Agent, or Firm* — Ingrassia Fisher & Lorenz, P.C.

(57) ABSTRACT

A display system for displaying an opening state of a motor vehicle door is provided that includes, but is not limited to a sensor system for detecting an opening state of the motor vehicle door. A display unit is connected to the sensor system for displaying the opening state of the motor vehicle door. A display element is redundantly connected redundantly to the sensor system is provided for displaying the opening state of the motor vehicle door. The probability of the display system correctly indicating the opening state of the motor vehicle door is thereby increased.

17 Claims, 1 Drawing Sheet

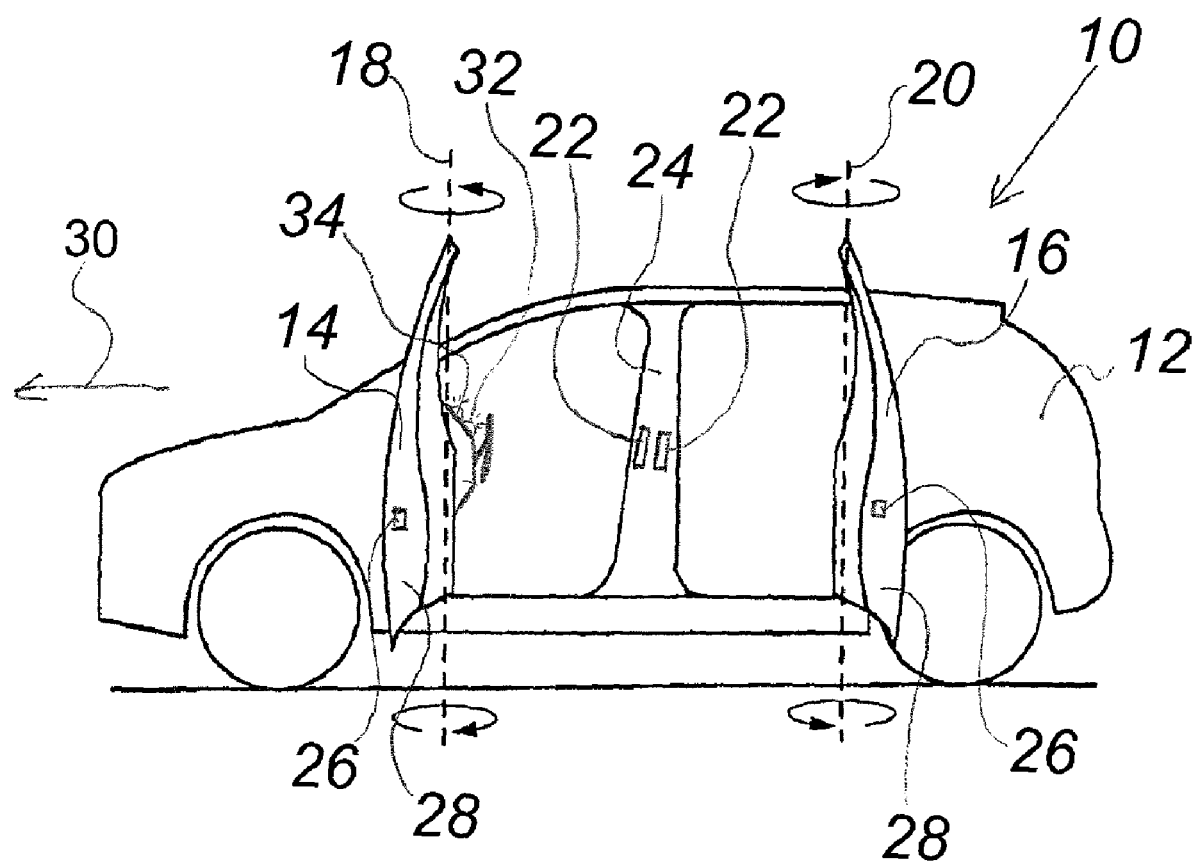

DISPLAY SYSTEM

CROSS-REFERENCE TO RELATED APPLICATION

This application claims priority to German Patent Application No. 102008012240.8, filed Mar. 3, 2008, which is incorporated herein by reference in its entirety.

TECHNICAL FIELD

The invention relates to a display system for displaying an opening state of a vehicle door, with the aid of which it can be signaled to a vehicle driver whether a vehicle door is closed or open.

BACKGROUND

In order to reduce the risk of a vehicle driver starting his vehicle despite a vehicle door still being open, it is known to display the opening state of a vehicle door with the aid of a display system. For this purpose, the display system comprises a sensor system by which means the opening state of the vehicle door may be detected. Connected to the sensor system is a display unit that comprises a warning light disposed in an instrument display panel in order to display the opening state of the vehicle door. Since such a display system comprises a safety-related component, there is a continuous need to display the opening state of the vehicle door particularly reliably.

It is at least one object of the invention to provide a display system for displaying an opening state of a vehicle door for which the probability of displaying the correct opening state of the vehicle door is increased. In addition, other objects, desirable features, and characteristics will become apparent from the subsequent summary and detailed description, and the appended claims, taken in conjunction with the accompanying drawings and this background.

SUMMARY

The display system according to an embodiment of the invention for displaying an opening state of a motor vehicle door comprises a sensor system by which means the opening state of the motor vehicle door can be detected. Connected to the sensor system is a display unit by which means the opening state of the motor vehicle door may be displayed. According to the embodiment of the invention, a display element connected redundantly to the sensor system is provided for displaying the opening state of the motor vehicle door.

Due to the display element which is redundant to the display unit, it is possible to signal the opening state of the motor vehicle door even when the display unit should be defective and/or is working incorrectly. For example, the display unit can comprise a warning light which has a defective illuminant. In the event that a motor vehicle door is not correctly closed, the display unit is triggered correctly with a signal current but due to the defective illuminant, no visual warning signal can be delivered. However, since a defective illuminant leads to a significantly modified electrical resistance and/or electrical current, the malfunction of the display unit can be detected and the redundant display element used to display the warning signal. The probability of correctly displaying the opening state of the motor vehicle door is thereby increased.

Particularly preferably used for the display element is a display element which is used for the motor vehicle in any case. This means that the display element in particular has a principal display function which differs from displaying the opening state of the motor vehicle door. For example, the redundant display element is used in its principal display function as a hazard warning light, which identifies the use of the hazard warning light. Therefore, if an incorrectly closed vehicle door cannot be correctly displayed by the display unit actually provided for this purpose, at least the hazard warning lights can deliver a flashing warning light as a replacement for the display unit.

Particularly preferably, the display element only displays the opening state of the motor vehicle door when the display of the opening state by the display unit is incorrect. In the event that the display unit can display the opening state of the motor vehicle door free from defects, no further display elements provided for other purposes are used in order to signal the opening state of the motor vehicle door. The risk of confusing a motor vehicle driver is thereby reduced. In the event that the display unit cannot correctly display the opening state of the motor vehicle door, at least another display element can deliver a warning signal to warn the motor vehicle driver. Even if the motor vehicle driver does not realize immediately the reason why the display element is delivering a warning signal, the motor vehicle driver is at least sufficiently made aware that a safety-critical malfunction and/or a safety-critical state may exist.

The display unit and/or the display element preferably display the opening state of the motor vehicle door at least visually. In particular, a flashing and/or constantly burning light may be provided for this purpose. Additionally or alternatively, the display may also be affected audibly, for example, by a warning sound. For the visual display, a red warning light is provided, for example, which is in particular positioned at a location which can easily be identified by a motor vehicle driver, for example, in the area of the instrument display panel.

The display element is in particular selected from the group of flashing warning lamp, interior lamp, reading lamp, central locking lamp, electronic odometer display, and/or electronic instrument panel display. It is thereby possible, for example, to make a lamp, which is provided in any case, flicker in the event of a malfunction of the display unit in order to thereby warn the motor vehicle driver. Furthermore, it is possible for example to display alphanumeric characters in the electronic odometer display and/or the electronic instrument display panel display. It is thereby possible to notify the motor vehicle driver of the reasons for the warning in a few words by means of the display element.

In a preferred embodiment, the sensor system comprises a first sensor for detecting a connection of the motor vehicle door in a direction transverse to the direction of travel. Furthermore, the sensor system comprises a second sensor for detecting a connection of the motor vehicle door in the direction of travel. Since not only one sensor but two sensors are used, the redundancy for the correct display of the opening state of the motor vehicle door is further increased. Furthermore, it is possible to detect a connection of the motor vehicle door in two different coordinate directions so that it is possible to lock the motor vehicle door in a verifiable manner in two different directions. This is particularly advantageous when the display system is used for a motor vehicle in which a motor vehicle front door and a motor vehicle rear door are hinged on sides pointing away from one another and the motor vehicle front door and the motor vehicle rear door can be connected directly to one another on the sides facing one another. In order to reliably detect the opening state of the motor vehicle doors, there can be provided a sensor which detects the connection of the rear door transverse to the direction of travel and a sensor, in particular precisely one sensor, which detect the connection of the motor vehicle doors to one another. It is thereby possible to make the closure of the motor vehicle doors redundantly and at the same time, be able to detect this state redundantly and display it redundantly. The risk of a motor vehicle driver driving off in his motor vehicle although a motor vehicle door is not yet closed is thus particularly low.

The embodiments of the invention further relates to a motor vehicle which comprises a display system which can be configured and further developed as described hereinbefore. The motor vehicle in particular has a motor vehicle bodywork to which a motor vehicle front door and a motor vehicle rear door are connected in an articulated manner. The motor vehicle front door and the motor vehicle rear door are preferably directly connectable to one another in the closed state. With the aid of the display system, the opening state of the motor vehicle doors can be detected and displayed reliably even with a complex configuration of a closure mechanism of the motor vehicle doors.

BRIEF DESCRIPTION OF THE DRAWINGS

The present invention will hereinafter be described in conjunction with the following drawing figures, wherein like numerals denote like elements, and:

FIG. 1 shows a schematic side view of a motor vehicle with the display system according to an embodiment of the invention.

DETAILED DESCRIPTION

The following detailed description is merely exemplary in nature and is not intended to limit application and uses. Furthermore, there is no intention to be bound by any theory presented in the preceding summary or background or the following detailed description.

The motor vehicle 10 shown in FIG. 1 comprises a motor vehicle bodywork 12 to which a motor vehicle front door 14 and a motor vehicle rear door 16 are connected in an articulated manner. The motor vehicle front door 14 is rotatable about a first axis of rotation 18 whereas the motor vehicle rear door is rotatable about a second axis of rotation 20. The axes of rotation 18, 20 are disposed on sides of the motor vehicle doors 14, 16 pointing away from one another so that the motor vehicle doors 14, 16 can pivot toward one another and away from one another.

In order to detect the opening state of the motor vehicle doors 14, 16, a first sensor 22 which is disposed on a B-pillar 24, is provided for each motor vehicle door 14, 16. In the closed state of the motor vehicle doors 14, 16, the motor vehicle doors 14, 16 abut against the B-pillar 24 which can be detected by the first sensors 22. In addition, the motor vehicle doors 14 each have a second sensor 26, which are disposed on side surfaces 28 of the motor vehicle doors 14, 16 which face one another in the closed state. A connection of the motor vehicle doors 14, 16 in the direction of travel 30 can be detected by the second sensors 28 whereas the first sensors 22 detect a connection of the motor vehicle doors 14, 16 transverse to the direction of travel 30.

If the sensors 22, 26 detect that a motor vehicle door 14, 16 is not correctly closed, a display unit 32 delivers a warning light. If the display unit 32 should be defective, a redundant display element 34 automatically delivers a warning light, wherein the redundant display element 34 may, for example, comprise a hazard warning light.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the as set forth in the appended claims and their legal equivalents.

What is claimed is:

1. A display system for displaying an opening state of a door of a motor vehicle comprising:
    a sensor system adapted to detect the opening state of the door;
    a display unit connected to the sensor system and adapted to display the opening state of the door; and
    a display element connected to the sensor system and adapted to display the opening state of the door;
    wherein the display element comprises a principal display function that differs from displaying the opening state of the door and the display element is adapted to only display the opening state of the door when the display of the opening state of the door by the display unit is incorrect.

2. The display system according to claim 1, wherein at least one of the display unit or the display element is adapted to display the opening state of the door at least visually.

3. The display system according to claim 1, wherein the display element is a flashing warning lamp.

4. The display system according to claim 1, wherein the display element is a, interior lamp.

5. The display system according to claim 1, wherein the display element is a, reading lamp.

6. The display system according to claim 1, wherein the display element is a, electronic odometer display.

7. The display system according to claim 1, wherein the display element is a, electronic instrument panel display.

8. The display system according to claim 1, wherein the display element is a central locking lamp.

9. The display system according to claim 1, wherein the sensor system comprises a first sensor adapted to detect a connection of the door in a transverse direction to a travel direction and a second sensor adapted to detect the connection of the door in the travel direction.

10. The display system according to claim 9, wherein the second sensor is adapted to detect a direct connection of a front door of the motor vehicle with a rear door of the motor vehicle.

11. A motor vehicle, comprising:
    a front door;
    a rear door connected to the front door in an articulated manner;
    a sensor system adapted to detect an opening state of the front door and the rear door;
    a display unit connected to the sensor system and adapted to display the opening state of the front door and the rear door; and
    a display element connected to the sensor system and adapted to display the opening state of the front door and the rear door;
    wherein the display element comprises a principal display function that differs from displaying the opening state and the display element is adapted to only display the opening state when the display of the opening state by the display unit is incorrect.

12. The motor vehicle according to claim 11, wherein at least one of the display unit or the display element is adapted to display the opening state of the front door and the rear door at least visually.

13. The motor vehicle according to claim 11, wherein the display element is a flashing warning lamp.

14. The motor vehicle according to claim 11, wherein the display element is a, interior lamp.

15. The motor vehicle according to claim 11, wherein the display element is a, reading lamp.

16. The motor vehicle according to claim 11, wherein the display element is a, electronic odometer display.

17. The motor vehicle according to claim 11, wherein the sensor system comprises a first sensor adapted to detect a connection of the front door and the rear door in a traverse direction to a travel direction and a second sensor adapted to detect the connection of the front door and the rear door in the travel direction.

* * * * *